United States Patent [19]
Jane Cabagnero

[11] Patent Number: 4,643,445
[45] Date of Patent: Feb. 17, 1987

[54] CHILDREN'S PUSH-CHAIR OR STROLLER

[76] Inventor: Ramon Jane Cabagnero, 203 Cartagena Street, 08013 Barcelona, Spain

[21] Appl. No.: 662,340

[22] Filed: Oct. 18, 1984

[30] Foreign Application Priority Data

Nov. 16, 1983 [ES] Spain .................................... 275941

[51] Int. Cl.$^4$ ............................................. B62B 7/08
[52] U.S. Cl. ................................... 280/644; 280/650; 280/658; 297/40
[58] Field of Search ............... 280/642, 643, 644, 650, 280/658, 647, 649; 297/27, 35, 39, 40, 41

[56] References Cited

U.S. PATENT DOCUMENTS

| | | | |
|---|---|---|---|
| 1,429,043 | 9/1922 | Martin | 297/40 |
| 1,576,075 | 3/1926 | Tisdell | 280/643 |
| 3,443,835 | 5/1969 | Brunskole | 295/35 |
| 4,118,052 | 10/1978 | Cabagnero | 280/642 |
| 4,293,144 | 10/1981 | Ida | 280/644 |
| 4,515,389 | 5/1985 | Kassai | 280/658 |
| 4,538,830 | 9/1985 | Nakao et al. | 280/647 |

Primary Examiner—John J. Love
Assistant Examiner—Eric D. Culbreth
Attorney, Agent, or Firm—Cushman, Darby & Cushman

[57] ABSTRACT

A collapsible stroller of the type that has a pair of spaced front legs, and a pair of spaced rear legs, with the front legs each having the upper handle-bar branch pivotally connected thereto, with the upper handle-bar branch also connected to a rear leg. A pair of armrests are provided, with each armrest having one end pivotally connected to an associated upper handlebar branch between the location where the upper handlebar branch is connected to the front legs and where it is connected to the rear legs. An opposite end of each armrest is pivotally connected to a rigid rod which is directly pivotally connected to one of the front legs. In this way, the armrest will be collapsed only when the stroller is also collapsed.

3 Claims, 3 Drawing Figures

U.S. Patent  Feb. 17, 1987  4,643,445
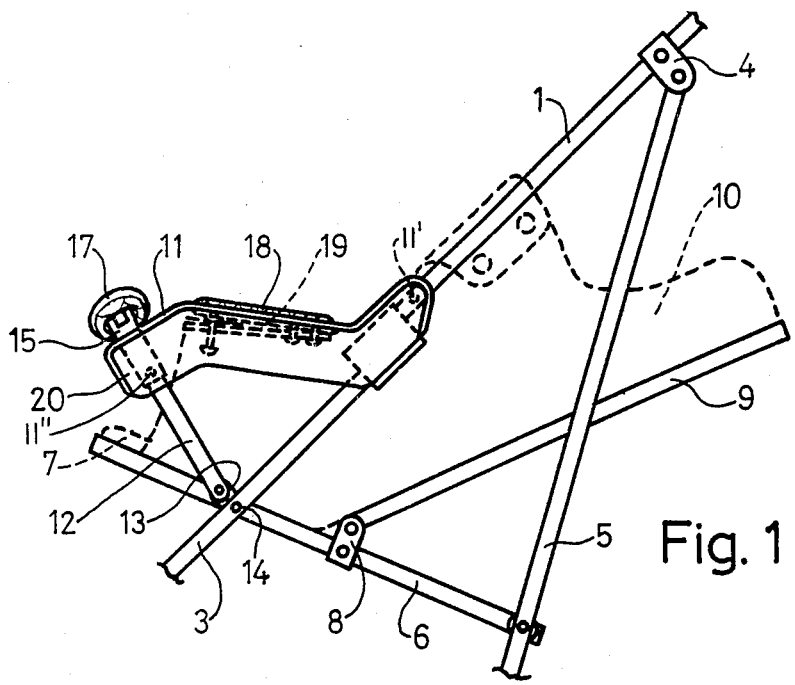
Fig. 1
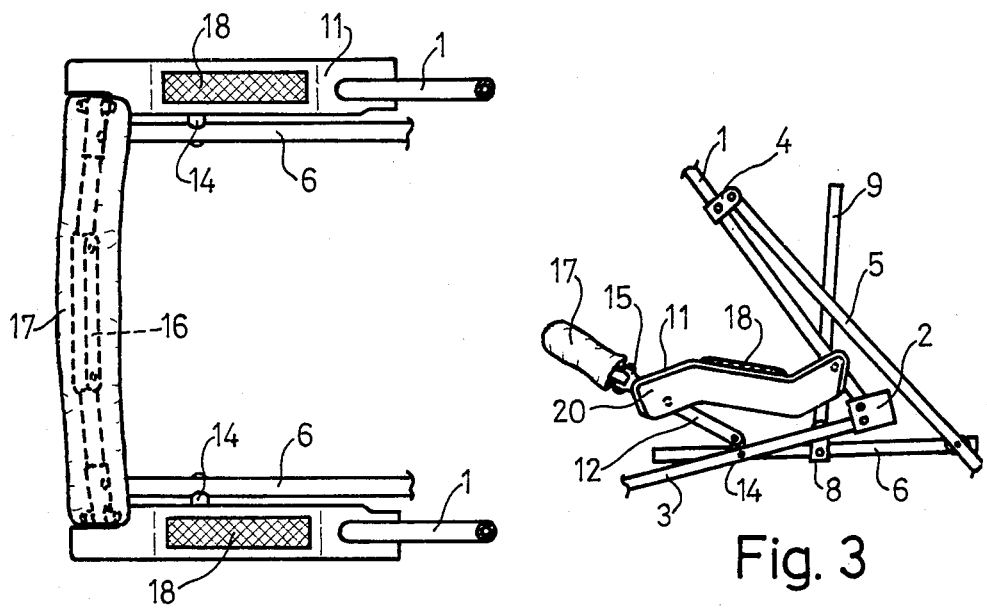
Fig. 2
Fig. 3

CHILDREN'S PUSH-CHAIR OR STROLLER

The present invention relates to an improved children's push-chair or stroller.

This push-chair or stroller is of the type being collapsed when its two sides are brought nearer, these sides in turn are collapsed in their pivoted intermediate portion relating the handlebar's branches with the front legs, the seat frame showing the pivoting assembly of the seat back frame which can be stablized at different positions by means which relate it to the push-chair's body.

This type of push-chair or stroller is described in the present applicant's own utility model No. 221 222, which model was further improved in the utility model No. 222 387 (U.S. Pat. No. 4,118,052, issued Oct. 3, 1978) and updated later on in the Spanish designs Nos. 89 954 and 96 059, and U.S. application Ser. No. 557,213, filed Dec. 2, 1983. The disclosures of U.S. Pat. No. 4,118,052 and Ser. No. 557,213 are incorporated by reference.

This push-chair or stroller, which shows a remarkable comfort for children despite its different components, still is collapsible in a compact and easy way to handle and carry about. The stroller has been improved by providing it with armrests and a front handrail increasing said comfort and concurrently setting up a higher safety condition for the child being better protected with the very particular feature that the push-chair or stroller still remains collapsable in a compact and easy way without requiring the detachment of any of the component members.

Typically, this push-chair or stroller has its armrests rearwardly pivoted to the handlebar's associated branches, whereas at the front side they are pivoted by corresponding tierods to the respective front legs, these tierods upwardly projecting where a front handrail is pivoted, this handrail also being built with mutually pivoted lengths.

So that the disclosure is better understood, a drawing sheet is attached to this specification wherein a practical embodiment example is shown only as a non-exhaustive example of the invention.

DESCRIPTION OF THE DRAWINGS

FIG. 1 shows a side elevation view of the main portion of the push-chair or stroller being provided with said armrests and handrail.

FIG. 2 shows a plan view of the front side of the push-chair or stroller, and

FIG. 3 shows in a lesser scale the side elevation of FIG. 1 at a half-collapsed position of the push-chair or stroller.

The stroller of the present invention includes two spaced side branches 1 which are foldable by means of a pivot connection in a pivot block 2 with the front legs 3 of the stroller also being connected to the pivot blocks 2 on either side of the stroller. At an intermediate point, the branch legs 1 include a fixed flange 4 from which is pivotably connected a rear leg 5 on each side of the stroller. Pivotably connected to each rear leg 5 is a seat support branch 6 which extends forwardly and is pivotally attached to each front leg 3 with a seat frame 7 pivotally mounted on the branches 6 and extending between the two sides of the stroller. A seat back branch 9 is pivotally attached on a flange 8 which is securely fastened on each branch 6. The seat back 9 has flexible sides 10 attached thereto with a forward portion thereof being coupled to each associated front leg 1 as indicated in FIG. 1. A pair of armrests as shown in FIG. 2 are pivotally mounted adjacent the rear portions on each branch 1 at 11' adjacent the lower end thereof just above the pivot blocks 2. The armrests are made with a plastic material molded piece and about the front edges are pivotally connected to legs 12 which, in turn, are pivotally connected to the respective front legs 3 at a point 11" spaced from the pivot blocks 2.

These tierods 12 include a head 15 upwardly projecting from the armrests' front side 11 and a front handrail 16 is pivoted therefrom at its ends, this handrail being made up with three mutually pivoted members and covered by resilient and soft sheath 17.

For a better comfort of the child, the upper face of the armrests shows the assembly of respective stuffed pads 18 fixed by inside rivets which concurrently are fastened on the seat sides 10 by means of a strip 19. Deflection of the sides 10 enables the folding of said sides upon the folding of the push-chair or stroller without any breaks being caused through deformation or stretching of the built-in fabric or strip.

The armrests 11 include at the outside front face conveniently decorated plates 20 which are coupled by simple pressure when conventional appendages to respective holes on the corresponding armrest face.

It is therefore understood this push-chair or stroller would be completed with all those proper members or components of any push-chair or stroller, such as the adjusting means of any seat back inclination, the pivoted framework relating the two sides of the push-chair or stroller, the blocking and safety means of any push-chair or stroller's unfolded position, the wheels for instance by pairs, and which are suitable mounted adjacent the lower ends of each leg 3, 5, and the self-guiding front wheels with blocking arrangement to convert them as unidirectional, the brakes and suspension, one footrest, one hood, one footguard, and other suitable and convenient accessories.

As illustrated in FIG. 1, this general structure of the push-chair or stroller also enables to be fully collapsible, occupying a minimum size thereby making much easier its handling, carrying about and storage.

What is claimed is:

1. In a collapsible stroller of the type having a pair of spaced front legs and a pair of spaced rear legs, said front legs each having an upper handlebar branch pivotally connected thereto at respective first pivot means, each said upper handlebar branch having an upper end pivotally connected to a rear leg, said stroller having a seat frame located between respective portions of said front and rear legs, the improvement comprising a pair of armrests with each armrest having one end pivotally connected to an associated upper handlebar branch at a second pivot means disposed between said first pivot means and said upper end of a respective upper handlebar branch, an opposite end of each armrest being pivotally connected by a third pivot means to a respective rigid rod means, with each said rigid rod means being directly pivotally connected to a respective one of said front legs.

2. The stroller as claimed in claim 1 wherein a front handrail is provided, said handrail having opposite ends with each end being pivotally connected to a head member, each said head member being mounted on a respective said rod means.

3. The stroller as claimed in claim 1 wherein said respective first, second and third pivot means are disposed such that, when the stroller is collapsed, each upper handlebar will be rotated about said second pivot means toward its associated armrest.

* * * * *